Feb. 26, 1924.
G. P. PILES
LEVEL
Filed Feb. 28, 1922
1,485,291
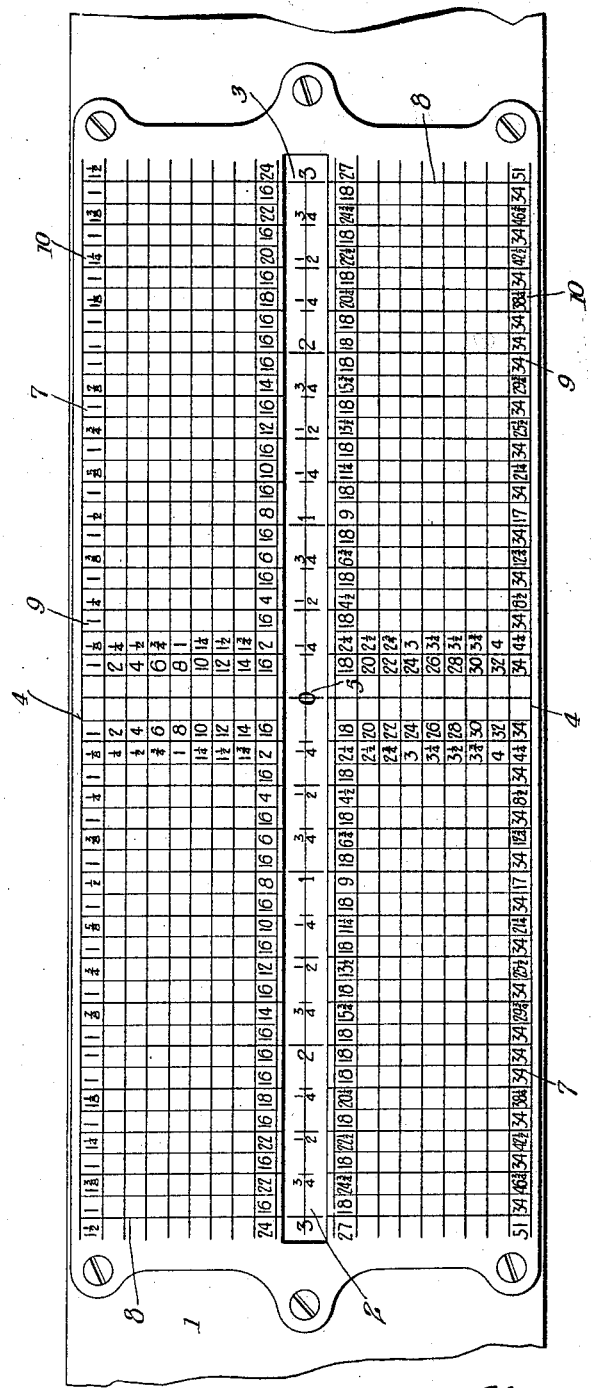
G. P. Piles
INVENTOR
BY Victor J. Evans
ATTORNEY
WITNESS:

Patented Feb. 26, 1924.

1,485,291

UNITED STATES PATENT OFFICE.

GLENN P. PILES, OF RUBLE, MISSOURI.

LEVEL.

Application filed February 28, 1922. Serial No. 539,902.

*To all whom it may concern:*

Be it known that I, GLENN P. PILES, a citizen of the United States, residing at Ruble, in the county of Reynolds and State of Missouri, have invented new and useful Improvements in Levels, of which the following is a specification.

My present invention has reference to an improved level.

My object is to produce a mechanic's level, of a construction to accurately determine the precise number of inches or fractions of inches which a timber is out of level when the improvement is arranged thereon, and as a consequence materially save time and labor on the part of the mechanic.

The drawing which accompanies and forms part of this specification illustrates a satisfactory embodiment of the improvement reduced to practice, and wherein:—

The figure illustrates a level in accordance with this invention.

The level includes a stock 1 which must be of a determined length, say two feet. Either let in the side of the stock or secured in any desired manner to one or both of the sides of the said level there is a longitudinally arranged bubble tube 2. The bubble tube is graduated into a quarter-inch scale which extends from the center to the ends of the said tube, the scale being broadly indicated by the numeral 3.

On the side of the stock there are computing scales 4 respectively, one to each side of the center or zero mark 5 of the bubble scale 3. The blocks 7 in the respective computing scales 6 are provided with vertical sub-divisions 8, the lines thus dividing the blocks of the scale being preferably of a different color from those which form the blocks of the scale proper, and in the right hand sub-divisions there are imprinted consecutively numerals indicating feet and which are indicated by the numeral 9, while in the adjacent sub-divisions there are imprinted numerals indicating inches and fractions of inches which are designated by the numeral 10. The computing scale is designed to impart to the user the knowledge of the exact number of inches or fractions of inches which a timber on which the stock rests is out of level. Thus in the first block of each scale there is imprinted "1" in the foot column and "1/8" in the inch column, in the lower block there is imprinted "2" in the foot column and "1/4" in the inch column, and in the next, "4" in the foot column, and "½" in the inch column. In the upper block of the next or second longitudinal column there is imprinted "1" in the foot column and "¼" in the inch column, in the next lower block there is imprinted "2" in the foot column and "½" in the inch column, in the next, "4" in the foot column, and "1" in the inch column, and so on. Assuming that the level rests on a timber 8 feet long, and the bubble in the bubble glass is in a line with the first quarter-inch mark on the bubble tube. This scale mark on the bubble tube is opposite the central division of the vertical blocks in the first column, and it will be noted that the timber is "¼" of an inch out of level in every 2 feet of its length, it being understood that 2 feet is the length of the stock. The operator merely glances at the "8" in the first column which indicates the number of feet, said number corresponding with the length of the timber. He next glances at the inch column next to the foot column and finds therein the number "1", which indicates that the timber is 1 inch out of level. Should the stock rest on a timber 20 feet long and the bubble in the tube be arranged opposite the half inch mark on the tube scale, the operator observes the numeral 20 in the foot scale and thereafter the inch number opposite the foot number in the same scale, finding the latter to be "5", and thus obtaining knowledge that the timber is 5 inches out of level. The manner in which the inch and fraction of inch scales are arranged in proper relation with respect to the foot scale opposite the said inch scale is determined as follows: The level is, as stated, 2 feet long. Say the length of a board to be measured is 20 feet long, and the bubble is at the first quarter of an inch mark on the bubble scale. We know that for each 2 feet, the timber is one-fourth of an inch out of level. The length of the level is divided into the length of the timber with "10" as a quotient. One-fourth of an inch, being the amount of inches which the timber is out of level for every 2 feet, multiplied into "10" leaves 2½ inches, which indicates the distance in inches which the entire timber is out of level.

It is thought that the foregoing description, when taken in connection with the drawings will fully set forth the construction and advantages of the improvement to those skilled in the art to which such inventions relate, and therefore further detailed description will not be attempted.

Having described the invention, I claim:—

In a device for the purpose set forth, a stock, a bubble tube arranged longitudinally thereon, graduated into a fractional inch scale from the center to the ends thereof, and computing scales on the stock divided into blocks, and the vertical rows of blocks being centrally in alignment with the graduations on the tube, said blocks having vertical sub-divisions, the aligning sub-divisions having imprinted therein foot scale marks, and the adjacent sub-divisions having imprinted therein inch scale marks or fractions thereof, as and for the purpose set forth.

In testimony whereof I affix my signature.

GLENN P. PILES.